US012650311B2

(12) United States Patent

He et al.

(10) Patent No.: US 12,650,311 B2
(45) Date of Patent: Jun. 9, 2026

(54) METHOD, ELECTRONIC DEVICE, AND COMPUTER PROGRAM PRODUCT FOR DETERMINING NAVIGATION PATH

(71) Applicant: Dell Products L.P., Round Rock, TX (US)

(72) Inventors: Bin He, Shanghai (CN); Wenlei Wu, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 17/992,047

(22) Filed: Nov. 22, 2022

(65) Prior Publication Data

US 2024/0133699 A1     Apr. 25, 2024
US 2024/0230349 A9     Jul. 11, 2024

(30) Foreign Application Priority Data

Oct. 19, 2022     (CN) .......................... 202211280791.9

(51) Int. Cl.
| | |
|---|---|
| *G01C 21/34* | (2006.01) |
| *H04W 4/024* | (2018.01) |
| *H04W 4/40* | (2018.01) |

(52) U.S. Cl.
CPC ........ *G01C 21/3461* (2013.01); *H04W 4/024* (2018.02); *H04W 4/40* (2018.02)

(58) Field of Classification Search
CPC .... G01C 21/3461; H04W 4/024; H04W 4/40; H04W 4/44; H04W 4/025; H04W 36/32

(Continued)

(56) References Cited

U.S. PATENT DOCUMENTS

| | | | | |
|---|---|---|---|---|
| 9,998,975 B1* | 6/2018 | Buchmueller | ...... | H04W 36/322 |
| 2012/0236717 A1* | 9/2012 | Saska | .................... | H04W 48/02 |
| | | | | 370/235 |

(Continued)

OTHER PUBLICATIONS

5G Automotive Association, "C-V2X Use cases Methodology, Examples and Service Level Requirements," White Paper, Version 1.0, Jun. 19, 2019, 77 pages.

(Continued)

*Primary Examiner* — Daniel M. Robert
*Assistant Examiner* — Helen Li
(74) *Attorney, Agent, or Firm* — Ryan, Mason & Lewis, LLP

(57)     ABSTRACT

Embodiments of the present disclosure provide a method, an electronic device, and a computer program product for determining a navigation path. The method may include acquiring a source geographical location and a destination geographical location received from a user side device. In addition, the method may include determining a navigation path from the source geographical location to the destination geographical location based on a communication resource heat database, the communication resource heat database including at least a plurality of geographical regions associated with the navigation path and communication resource heat of each of the plurality of geographical regions, the communication resource heat including signal quality, signal strength, and a remaining resource capacity. Then, the method may include sending the determined navigation path to the user side device.

20 Claims, 7 Drawing Sheets

(58) Field of Classification Search
USPC ........................................................ 701/420
See application file for complete search history.

(56) References Cited

U.S. PATENT DOCUMENTS

| | | | |
|---|---|---|---|
| 2012/0307750 A1* | 12/2012 | Hunukumbure | H04W 16/02 370/329 |
| 2014/0067257 A1* | 3/2014 | Dave | H04W 4/40 701/423 |
| 2014/0099964 A1* | 4/2014 | Lee | H04W 16/18 455/448 |
| 2015/0195726 A1* | 7/2015 | Bhatia | H04W 24/04 455/67.11 |
| 2017/0041885 A1* | 2/2017 | Chandrasekhar | H04W 52/346 |
| 2017/0127320 A1* | 5/2017 | Mok | H04W 36/0077 |
| 2017/0202006 A1* | 7/2017 | Rao | H04W 72/542 |
| 2018/0317142 A1* | 11/2018 | Kumar | H04W 36/0085 |
| 2020/0296054 A1* | 9/2020 | Asawa | H04L 47/821 |
| 2020/0336872 A1* | 10/2020 | Basu Mallick | H04W 4/40 |
| 2021/0070317 A1* | 3/2021 | Hitotsumatsu | G01C 21/3461 |
| 2021/0227535 A1* | 7/2021 | Li | H04W 72/51 |
| 2022/0086218 A1* | 3/2022 | Sabella | H04M 15/66 |
| 2022/0217542 A1* | 7/2022 | Centonza | H04B 7/0617 |
| 2023/0074288 A1* | 3/2023 | Filippou | H04L 47/127 |
| 2024/0040433 A1* | 2/2024 | Cionca | H04L 43/16 |

OTHER PUBLICATIONS

5G Automotive Association, "5GS Enhancements for Providing Predictive QoS in C-V2X," Technical Report, TR-200055, May 2020, 60 pages.
3GPP "3rd Generation Partnership Project; Technical Specification Group Radio Access Network; NR; Radio Resource Control (RRC) protocol specification (Release 16)," 3GPP TS 38.331, version 16.3.1, Jan. 2021, 932 pages.
ETSI "Multi-access Edge Computing (MEC); Radio Network Information API," Group Specification MEC 012, version 2.1.1, Dec. 2019, 66 pages.
ETSI "Multi-access Edge Computing (MEC); Phase 2: Use Cases and Requirements," Group Specification MEC 002, version 2.1.1, Oct. 2018, 66 pages.
ETSI "Mobile Edge Computing (MEC); End to End Mobility Aspects," Group Report, MEC 018, version 1.1.1, Oct. 2017, 52 pages.
ETSI "Multi-access Edge Computing (MEC); Ue Identity API," Group Specification MEC 014, version 2.1.1, Mar. 2021, 14 pages.
ETSI "Multi-access Edge Computing (MEC); Traffic Management APIs," Group Specification MEC 015, version 2.1.1, Jun. 2020, 33 pages.

* cited by examiner

202

Acquire a source geographical location and a destination geographical location received from a user side device

204

Determine a navigation path from the source geographical location to the destination geographical location based on a communication resource heat database, the communication resource heat database including at least a plurality of geographical regions associated with the navigation path and communication resource heat of each of the plurality of geographical regions, the communication resource heat including signal quality, signal strength, and a remaining resource capacity

206

Send the determined navigation path to the user side device

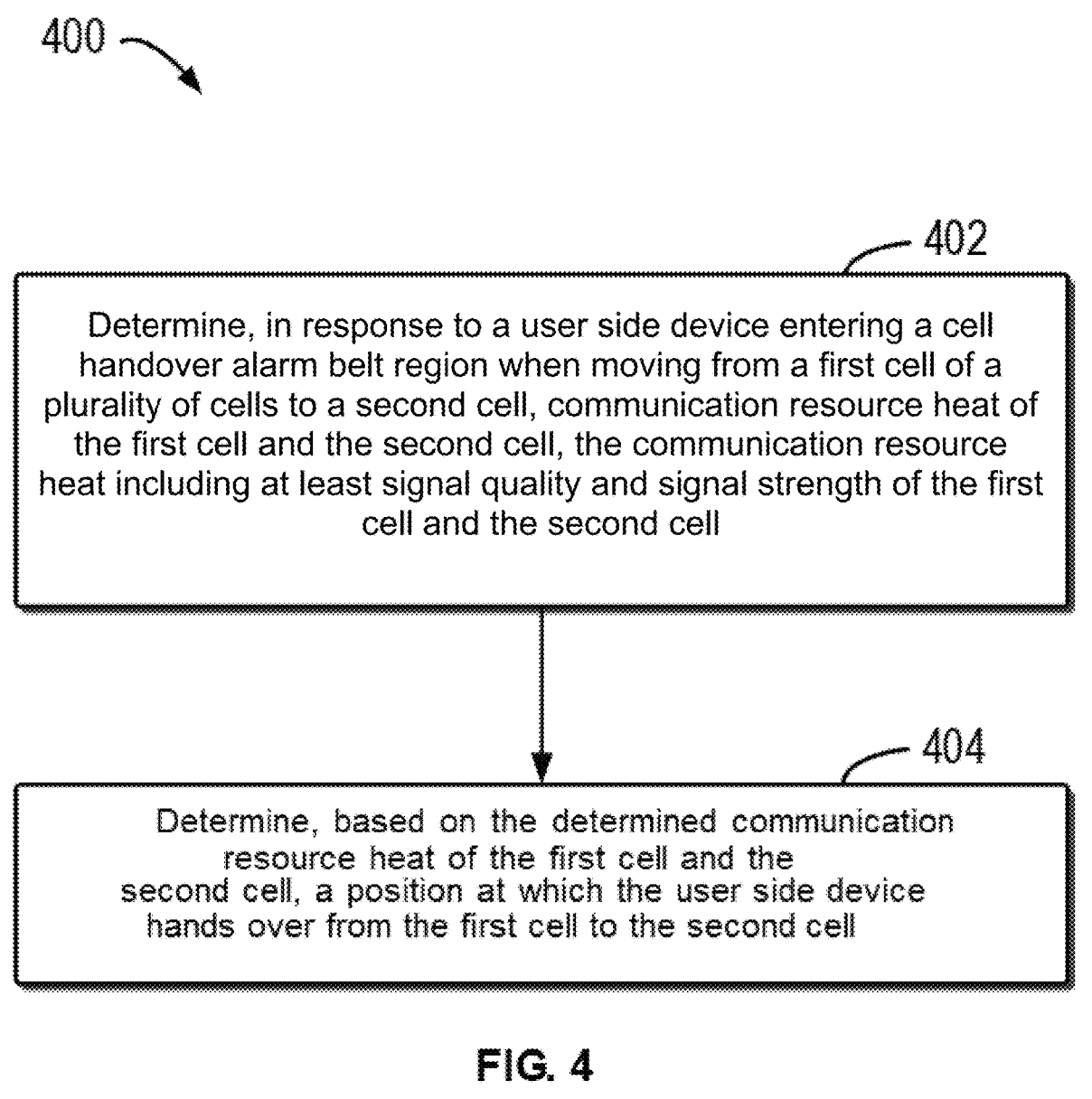

Determine, in response to a user side device entering a cell handover alarm belt region when moving from a first cell of a plurality of cells to a second cell, communication resource heat of the first cell and the second cell, the communication resource heat including at least signal quality and signal strength of the first cell and the second cell

404

Determine, based on the determined communication resource heat of the first cell and the second cell, a position at which the user side device hands over from the first cell to the second cell

FIG. 4

METHOD, ELECTRONIC DEVICE, AND COMPUTER PROGRAM PRODUCT FOR DETERMINING NAVIGATION PATH

RELATED APPLICATION

The present application claims priority to Chinese Patent Application No. 202211280791.9, filed Oct. 19, 2022, and entitled "Method, Electronic Device, and Computer Program Product for Determining Navigation Path," which is incorporated by reference herein in its entirety.

Field

Embodiments of the present disclosure relate to the field of communication, and more particularly, to a method, an electronic device, and a computer program product for determining a navigation path.

BACKGROUND

Currently, vehicle navigation technology is utilized to plan a driving path based mainly on a path length, a traffic condition (e.g., congestion or free driving), and/or time consumption, and may also take a toll factor into account. With the development of communication networks and autonomous driving technology, user mobile terminals are implemented in a great diversity of forms. Automobiles and even unmanned aerial vehicles based on cellular networks are all user mobile terminals in relatively novel forms, which can be positioned through a global positioning system (GPS), and realize path planning through a high-precision three-dimensional spatial map and an obstacle detection strategy. Remotely operated driving, autonomous driving, and high-definition maps significantly improve network quality, all of which put forward higher requirements for navigation technology.

SUMMARY

Embodiments of the present disclosure provide a solution for determining a navigation path.

In a first aspect of the present disclosure, a method for determining a navigation path is provided. The method may include acquiring a source geographical location and a destination geographical location received from a user side device. In addition, the method may include determining a navigation path from the source geographical location to the destination geographical location based on a communication resource heat database, the communication resource heat database including at least a plurality of geographical regions associated with the navigation path and communication resource heat of each of the plurality of geographical regions, the communication resource heat including signal quality, signal strength, and a remaining resource capacity. Then, the method may include sending the determined navigation path to the user side device.

In a second aspect of the present disclosure, an electronic device is provided, including a processor; and a memory coupled to the processor and having instructions stored therein, where the instructions, when executed by the processor, cause the electronic device to perform actions including: acquiring a source geographical location and a destination geographical location received from a user side device; determining a navigation path from the source geographical location to the destination geographical location based on a communication resource heat database, the communication resource heat database including at least a plurality of geographical regions associated with the navigation path and communication resource heat of each of the plurality of geographical regions, the communication resource heat including signal quality, signal strength, and a remaining resource capacity; and sending the determined navigation path to the user side device.

In a third aspect of the present disclosure, a computer program product is provided, where the computer program product is tangibly stored on a non-transitory computer-readable medium and includes machine-executable instructions, where the machine-executable instructions, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the accompanying drawings:

FIG. 2 is a flow chart of a process of determining a navigation path according to an embodiment of the present disclosure;

FIG. 4 is a flow chart of a process of determining a position for cell handover according to an embodiment of the present disclosure;

DETAILED DESCRIPTION

Figure 1A:
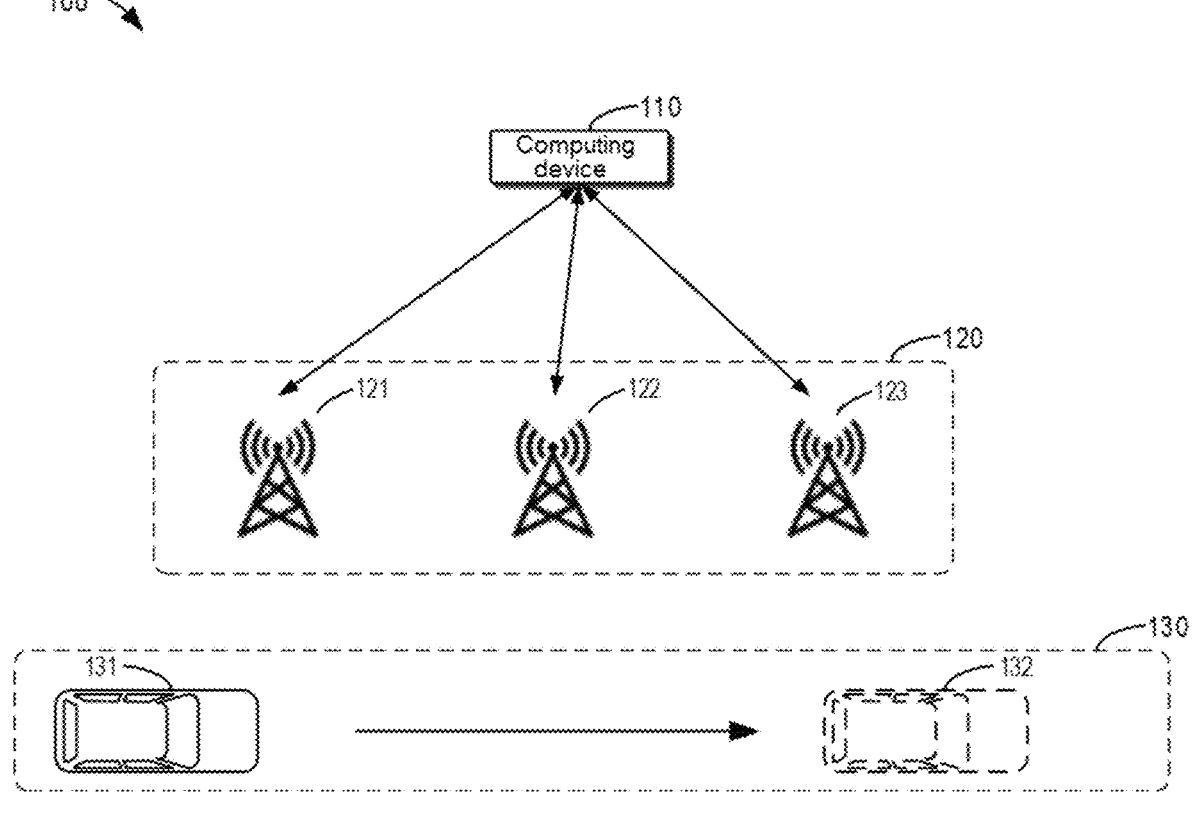
FIG. 1A is a schematic diagram of an example environment according to an embodiment of the present disclosure.

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second," and the like may refer to different or identical objects. Other explicit and implicit definitions may also be included below.

As discussed above, at present, navigation system options may typically be set as either based on time costs or based on toll costs. However, for functions such as perspective and high-definition (e.g., local) map updates that require seamless and high-quality access to network services, conventional applications of a network of vehicles are often not sufficiently stable and secure to achieve the above functions. It should be understood that use cases of the network of vehicles have specific uplink/downlink (DL/UL) requirements for network quality of each application. Currently, vehicle navigation is based mainly on a traffic condition (e.g., congestion or free driving) or time consumption, and may also take the toll costs into account. A wireless networking condition is currently uncommon for a path planning algorithm, but 5G Automotive Association (5GAA) Technical Specification TS200055 lists specific DL/UL requirements for network quality of remote driving and high-definition maps. Since the Internet of Vehicles and autonomous driving technology put forward very high requirements for cellular network communication, it is crucial to incorporate radio network service factors into path planning or navigation technology. However, no path planning mechanism that supports sufficient consideration of network performance currently exists.

In order to solve, at least in part, the above problem, an embodiment of the present disclosure provides a novel solution for determining a navigation path. Firstly, a computing device may receive a source geographical location and a destination geographical location of a navigation path from a user side device. Then, the computing device may determine the navigation path from the source geographical location to the destination geographical location based on a communication resource heat database. The communication resource heat database includes at least a plurality of geographical regions associated with the navigation path and communication resource heat of each of the plurality of geographical regions, and the communication resource heat includes signal quality, signal strength, and a remaining resource capacity. Then, the computing device may send the determined navigation path to the user side device, so as to guide the user side device to complete a driving operation. Through the above operations, navigation path planning of 5G communication scenarios such as the network of vehicles or autonomous driving can be realized, so as to take more factors into account during navigation path planning, so that the user side device such as a vehicle is always in a good communication condition in a planned path.

FIG. 1A is a schematic diagram of example environment 100 according to an embodiment of the present disclosure. In example environment 100, a device and/or a process according to an embodiment of the present disclosure may be implemented. As shown in FIG. 1A, example environment 100 may include computing device 110, cellular cell 120, and navigation path 130 planned for a vehicle.

In FIG. 1A, computing device 110 may be any device with a computing capability arranged on a server side. As a non-limiting example, the computing device may be any type of a fixed computing device, a mobile computing device, or a portable computing device, including but not limited to a desktop computer, a laptop computer, a notebook computer, a netbook computer, a tablet computer, a smartphone, and the like. All or part of the components of the computing device may be distributed in a cloud. The computing device may also adopt a cloud-edge architecture. It should be understood that computing device 110 may be provided with a storage system, for example, a hard disk drive (HDD), a solid state disk (SSD), a removable disk, any other magnetic storage device, and any other optical storage device, or any combination thereof.

In addition, as shown in FIG. 1A, cellular cell 120 may include a plurality of base stations 121, 122, 123, etc. It should be understood that each base station corresponds to a cellular cell, and is illustratively configured to acquire communication resource heat data uploaded at least in part, for example, by a mobile terminal (an illustrative example of what is more generally referred to herein as a "user side device," where other examples of user side devices include vehicles and/or navigation devices) that is handing over to the base station, and to upload the data to computing device 110. When a user determines source geographical location 131 and destination geographical location 132 of navigation path 130, computing device 110 may analyze the communication resource heat data to evaluate a level of a wireless communication service that can be provided by each cellular cell 120 passed through by navigation path 130, so as to select a navigation path, on which quality of wireless communication service is suitable for the network of vehicles or autonomous driving operation, for the user side device.

Figure 1B:
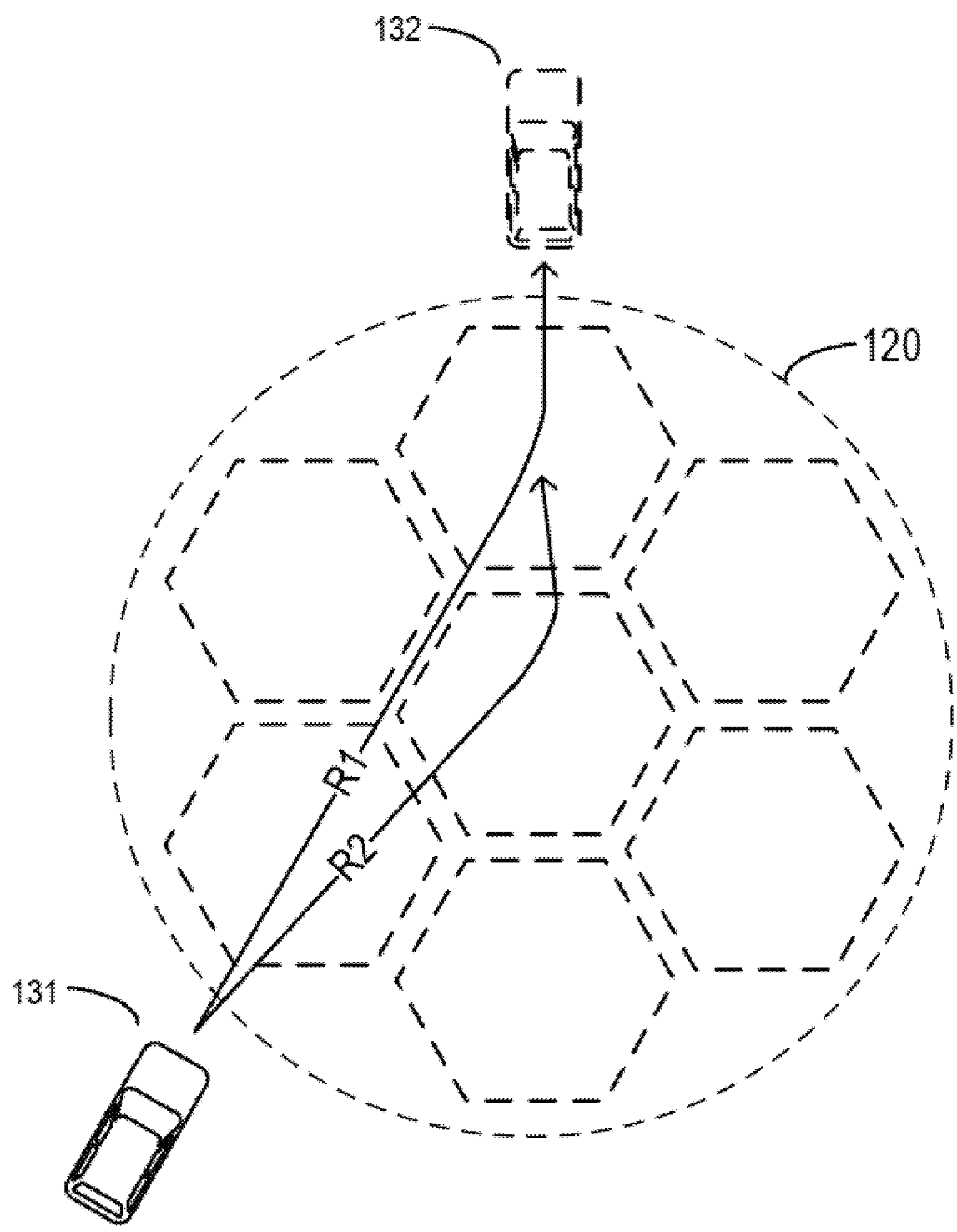
FIG. 1B is a schematic diagram of path planning of an example environment according to an embodiment of the present disclosure.

FIG. 1B is a schematic diagram of path planning of an example environment according to an embodiment of the present disclosure. As shown in FIG. 1B, it is assumed that two planned navigation paths R1 and R2 exist between source geographical location 131 and destination geographical location 132, and both navigation paths R1 and R2 pass through cellular cell 120 formed by a plurality of cellular cells. A navigation path such as navigation path R1 traveling along an edge of one or more cellular cells may experience different wireless communication service quality than a navigation path such as navigation path R2 traveling at or near the center of one or more cellular cells. Since the quality of wireless communication service in the center of a cellular cell is generally higher than the quality of wireless communication service at the edge of the cellular cell, computing device 110 may recommend navigation path R2 with higher quality of wireless communication service to the user on the basis of considering a factor of quality of wireless communication.

It should be understood that FIG. 1A and FIG. 1B are intended only to illustrate some concepts of the present disclosure and are not intended to limit the scope of the present disclosure. For example, in addition to navigation paths R1 and R2, a plurality of other navigation paths may also exist, and in addition to cellular cell 120, more cellular cells may also exist.

A process of determining a navigation path according to an embodiment of the present disclosure will be described in detail below with reference to FIG. 2. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

FIG. 2 is a flow chart of process 200 of determining a navigation path according to an embodiment of the present disclosure. Process 200 of determining a navigation path according to this embodiment of the present disclosure is described now with reference to FIG. 2. For ease of understanding, specific examples mentioned in the following description are illustrative and are not intended to limit the protection scope of the present disclosure.

As shown in FIG. 2, in step 202, computing device 110 may acquire source geographical location 131 and destination geographical location 132 received from a user side device. As an example, when a user needs to obtain navigation path 130 from source geographical location 131 to destination geographical location 132, the user may enter source geographical location 131 and destination geographical location 132 in the user side device. It should be understood that the user may enter information related to source geographical location 131 and destination geographical location 132 through a touch screen or a keyboard, or the user may enter the information through a voice instruction. In addition, source geographical location 131 may be any starting position or a current position of the user side device. In addition, computing device 110 may be a Multi-access Edge Computing (MEC) server. The server is provided with a plurality of application program interfaces, so as to acquire a plurality of pieces of communication resource information of each cellular cell.

In step 204, computing device 110 may determine navigation path 130 from source geographical location 131 to destination geographical location 132 based on a communication resource heat database. It should be understood that the communication resource heat database is predetermined by computing device 110, which includes at least a plurality of geographical regions associated with navigation path 130 and communication resource heat of each of the plurality of geographical regions, and the communication resource heat may include signal quality, signal strength, a remaining resource capacity, and the like. In other words, the communication resource heat database may be a heat map that projects communication resource heat of each geographical region onto each geographical location.

In step 206, computing device 110 may send determined navigation path 130 to the user side device. In this way, the user side device can acquire a navigation path recommendation that takes the quality of wireless communication into account, so as to ensure the quality of wireless signals of the user side device during the driving.

Figure 3:
FIG. 3 is a schematic diagram of determining or updating a communication resource heat database according to an embodiment of the present disclosure.

FIG. 3 is a schematic diagram of determining or updating communication resource heat database 300 according to an embodiment of the present disclosure. As shown in FIG. 3, communication resource heat database 300 is created on lattice grids of a two-dimensional map. As another example, for aircraft such as unmanned aerial vehicles, communication resource heat database 300 may also be extended to three dimensions.

It should be understood that the plurality of geographical regions described above may be a plurality of two-dimensional lattice grid regions in each cellular cell. As shown in FIG. 3, at least part of communication resource heat database 300 may include a plurality of grid regions wholly or partially located in one cellular cell 310, for example, grid region 320 in FIG. 3. Grid region 320 is formed by a plurality of grid regions.

In order to create communication resource heat database 300, computing device 110 may determine, based on historical signal strength and historical signal quality uploaded by at least some users and in historical data associated with each grid region, signal strength and signal quality of the corresponding grid region. As an example, to evaluate signals in each grid, computing device 110 may utilize a communication quality report uploaded from a user device (represented by "○" in the figure) in each grid region in grid region 320. An average value may be calculated using a plurality of pieces of data in a predetermined time period (for example, the latest) as communication resource heat. If a grid region does not have enough samples (for example, a top-left grid region in grid region 320), computing device

110 may use samples of the nearest adjacent grid region for calculation. If a grid region is on a road but has a very weak or no wireless communication signal, such grid region should be marked as a "blind region." In some embodiments, whenever a new sample arrives, computing device 110 may update communication resource heat data of each grid to ensure that the data may not be out of date.

In addition, computing device 110 may determine a remaining resource capacity of a cellular cell as a remaining resource capacity of all grid regions in the cellular cell by acquiring a used resource capacity of the cellular cell. Specifically, when computing device 110 is an MEC server or associated therewith, an extended service may be created. As an example, the extended service may query for identities of all user equipment in a particular cell through an MEC application programming interface (API) known as MEC 014, and then query for, through another MEC API known as MEC 015, capacities of the cell belonging to target user equipment. In this way, a resource capacity consumed by each cell can be calculated. The capacity of the cell minus the consumed resource capacity is the remaining resource capacity.

Computing device 110 can determine or update communication resource heat database 300 based on the determined signal strength and signal quality of the corresponding grid region and the remaining resource capacity.

In some embodiments, the communication resource heat of each geographical region in communication resource heat database 300 may also be predicted based on historical data associated with the geographical region.

In some embodiments, the plurality of geographical regions described above may also be a plurality of cellular cells. It should be understood that radio signal attenuation generally occurs at an edge of a cellular cell, and signal strength at the edge of each cellular cell is much lower than signal strength in the center of the cell. When the user side device moves from one cell to another cell, handover may occur when signals provided by a current cell and a target cell satisfy a predetermined condition. In order to ensure the quality of communication during the handover, the communication resource heat database may also include a cell handover alarm belt region of each cell. The cell handover alarm belt region is determined based on a position for cell handover among the plurality of cells in historical data associated with the plurality of cells.

FIG. 4 is a flow chart of process 400 of determining a position for cell handover according to an embodiment of the present disclosure. Process 400 of determining a position for cell handover according to this embodiment of the present disclosure is described now with reference to FIG. 4. For ease of understanding, specific examples mentioned in the following description are illustrative and are not intended to limit the protection scope of the present disclosure.

As shown in FIG. 4, in step 402, computing device 110 may determine, in response to a user side device entering the cell handover alarm belt region when moving from a first cell of a plurality of cells to a second cell, communication resource heat of the first cell and the second cell, the communication resource heat including at least signal quality and signal strength of the first cell and the second cell.

In step 404, computing device 110 may determine, based on the determined communication resource heat of the first cell and the second cell, a position at which the user side device hands over from the first cell to the second cell.

Figure 5:
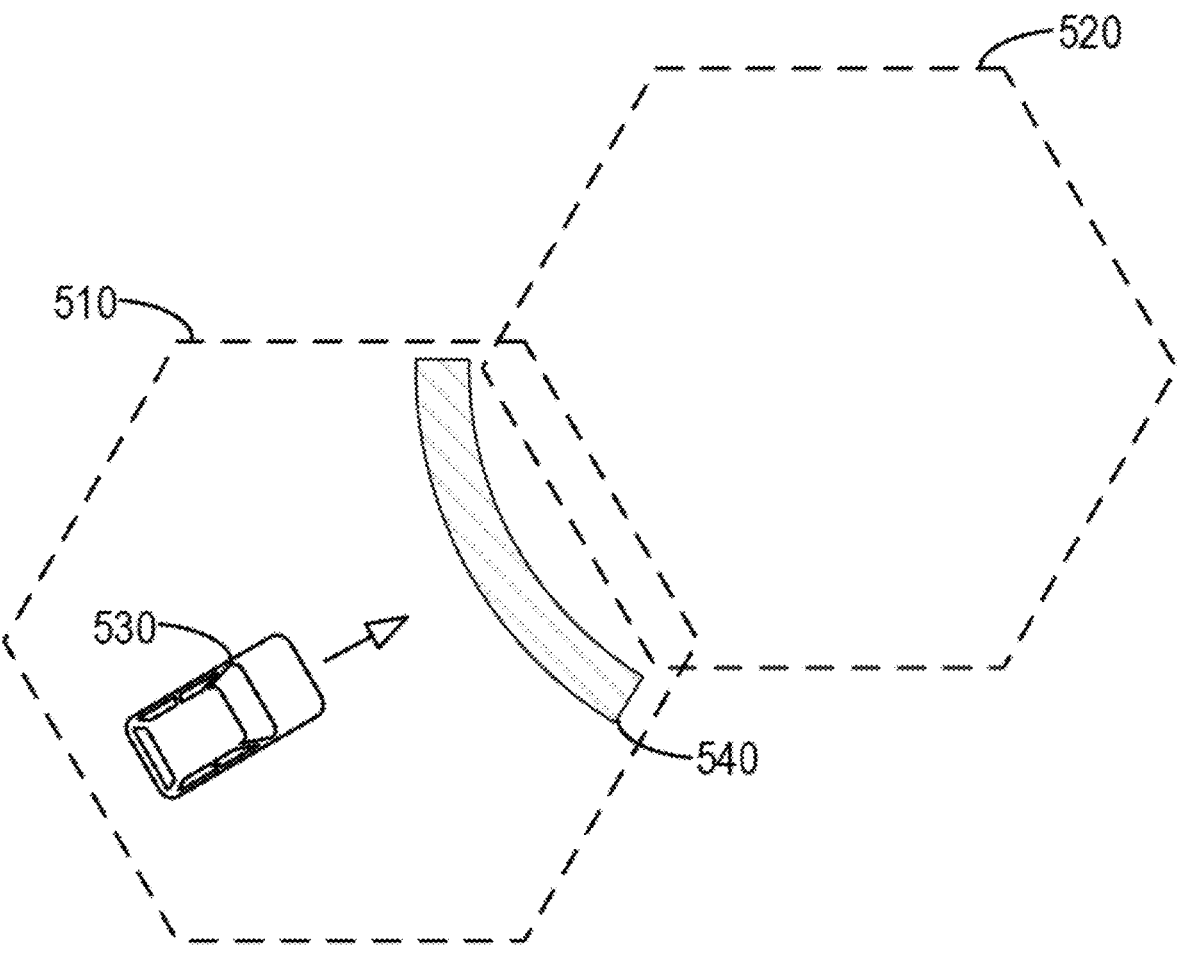
FIG. 5 is a schematic diagram of determining a position for cell handover according to an embodiment of the present disclosure.

FIG. 5 is a schematic diagram of determining a position for cell handover according to an embodiment of the present disclosure. As shown in FIG. 5, during the movement of user side device 530 from first cell 510 to second cell 520, when user side device 530 enters cell handover alarm belt region 540, user side device 530 begins to detect signal quality and signal strength of first cell 510 and second cell 520, and hands over when the signal quality of second cell 520 is sufficient to support normal operation of user side device 530. In this way, handover can be completed in time without the need to perform the handover when the quality of communication of the current cell is too low to perform the normal operation of the user side device.

In some embodiments, communication resource heat of first cell 510 and second cell 520 further includes remaining resource capacities of first cell 510 and second cell 520. The remaining resource capacities are determined based on used resource capacities of first cell 510 and second cell 520.

In some embodiments, the plurality of cells correspond to roadside base stations of the Internet of Vehicles respectively, and the user side device is a vehicle or a navigation device built in the vehicle.

Through the above embodiments, a path of network resources with more stable and higher quality can be planned for the user by using each cell in the navigation path or even a communication resource heat database of each grid in each cell. In addition, since a predetermined cell handover alarm belt region is further provided in the communication resource heat database, the user side device does not need to experience degradation of the quality of communication during the completion of the handover.

Figure 6:
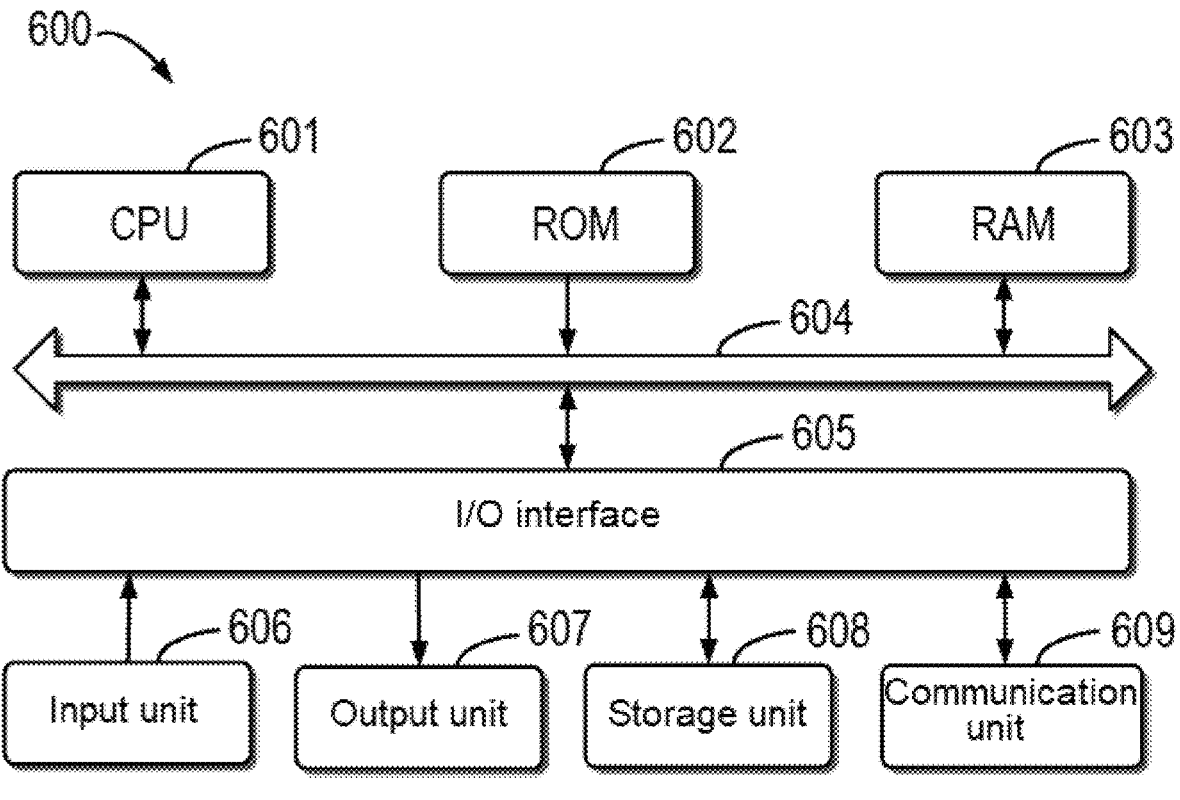
FIG. 6 is a block diagram of an example device that may be used to implement embodiments of the present disclosure.

FIG. 6 is a block diagram of example device 600, also referred to herein as an electronic device, that may be configured to implement embodiments of the present disclosure. For example, device 600 may be configured to implement computing device 110 as shown in FIG. 1. As shown in the drawing, device 600 includes a central processing unit (CPU) 601 that may perform various appropriate actions and processing according to computer program instructions stored in read-only memory (ROM) 602 or computer program instructions loaded from storage unit 608 into random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 performs the various methods and processing described above, such as processes 200 and/or 400. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or a plurality of steps of any process described above may be implemented. Alternatively, in other embodiments, CPU 601 may be configured in any other suitable manner (for example, by means of firmware) to perform a process such as processes 200 and/or 400.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for determining a navigation path, comprising:

acquiring a source geographical location and a destination geographical location received from a user side device;

determining the navigation path from the source geographical location to the destination geographical location based on a communication resource heat database, the communication resource heat database comprising at least a plurality of geographical regions associated with the navigation path and communication resource heat of each of the plurality of geographical regions, the communication resource heat comprising signal quality, signal strength, and a remaining resource capacity; and sending the determined navigation path to the user side device;

wherein the plurality of geographical regions comprise respective ones of a plurality of grid regions of at least one cell of a cellular system;

wherein the signal quality and signal strength are each separately determined on a per grid region basis for each of the plurality of grid regions of the at least one cell, the communication resource heat database comprising separate grid-level entries for respective multiple ones of the grid regions in a particular one of the cells, the multiple grid regions collectively spanning the particular cell in its entirety, with a given one of the grid-level entries for a corresponding one of the grid regions being based on the signal quality and signal strength determined for the corresponding grid region, and wherein the grid-level entries for the respective multiple ones of the grid regions in the particular one of the cells are each associated in the communication resource heat database with a same value of remaining resource capacity for the particular one of the cells; and wherein the remaining resource capacity is determined on a per cell basis, for each of the one or more cells, for association with each of the plurality of grid regions of a corresponding one of the one or more cells, by (i) identifying user side devices in the at least one cell through a first set of queries to a first application programming interface (API) of a multi-access edge computing (MEC) server, (ii) determining amounts of resources of the at least one cell that are allocated to the identified user side devices in the at least one cell through a second set of queries, different than the first set of queries, to a second API of the MEC server, the second API of the MEC server being different than the first API of the MEC server, the second set of queries specifying target user side devices corresponding to respective ones of the identified user side devices as determined via the first set of queries, and (iii) computing the remaining resource capacity as a function of the amounts of resources that are allocated to the identified user side devices in the at least one cell and a total resource capacity of the at least one cell, the function comprising a difference between the total resource capacity of the at least one cell and a sum of the amounts of resources that are allocated to the identified user side devices.

2. The method according to claim 1, further comprising:

determining, based on historical signal strength and historical signal quality uploaded by at least some users and in historical data associated with each grid region, signal strength and signal quality of the corresponding grid region;

determining a remaining resource capacity of a given cell of the at least one cell as a remaining resource capacity of the corresponding grid region by acquiring a used resource capacity of the given cell; and updating the communication resource heat database based on the determined signal strength and signal quality of the corresponding grid region and the remaining resource capacity.

3. The method according to claim 1, wherein the plurality of grid regions comprise two-dimensional lattice grids.

4. The method according to claim 1, wherein the plurality of geographical regions comprise a plurality of cells, and the communication resource heat database further comprises a cell handover alarm belt region of the plurality of cells, the cell handover alarm belt region being determined based on a position for cell handover among the plurality of cells in historical data associated with the plurality of cells.

5. The method according to claim 4, further comprising:

determining, in response to the user side device entering the cell handover alarm belt region when moving from a first cell of the plurality of cells to a second cell, communication resource heat of the first cell and the second cell, the communication resource heat comprising at least signal quality and signal strength of the first cell and the second cell; and determining, based on the determined communication resource heat of the first cell and the second cell, a position at which the user side device hands over from the first cell to the second cell.

6. The method according to claim 5, wherein the communication resource heat of the first cell and the second cell further comprises remaining resource capacities of the first cell and the second cell, the remaining resource capacities being determined based on used resource capacities of the first cell and the second cell.

7. The method according to claim 4, wherein the plurality of cells correspond to roadside base stations of the Internet of Vehicles respectively, and the user side device is a vehicle or a navigation device built in the vehicle.

8. The method according to claim 1, wherein the communication resource heat of each geographical region in the communication resource heat database is predicted based on historical data associated with the geographical region.

9. An electronic device, comprising:

at least one processor; and memory coupled to the at least one processor and having instructions stored therein, wherein the instructions, when executed by the at least one processor, cause the electronic device to perform actions comprising:

acquiring a source geographical location and a destination geographical location received from a user side device;

determining a navigation path from the source geographical location to the destination geographical location based on a communication resource heat database, the communication resource heat database comprising at least a plurality of geographical regions associated with the navigation path and communication resource heat of each of the plurality of geographical regions, the communication resource heat comprising signal quality, signal strength, and a remaining resource capacity; and sending the determined navigation path to the user side device;

wherein the plurality of geographical regions comprise respective ones of a plurality of grid regions of at least one cell of a cellular system;

wherein the signal quality and signal strength are each separately determined on a per grid region basis for each of the plurality of grid regions of the at least one cell, the communication resource heat database comprising separate grid-level entries for respective multiple ones of the grid regions in a particular one of the cells, the multiple grid regions collectively spanning the particular cell in its entirety, with a given one of the grid-level entries for a corresponding one of the grid regions being based on the signal quality and signal strength determined for the corresponding grid region, and wherein the grid-level entries for the respective multiple ones of the grid regions in the particular one of the cells are each associated in the communication resource heat database with a same value of remaining resource capacity for the particular one of the cells; and wherein the remaining resource capacity is determined on a per cell basis, for each of the one or more cells, for association with each of the plurality of grid regions of a corresponding one of the one or more cells, by (i) identifying user side devices in the at least one cell through a first set of queries to a first application programming interface (API) of a multi-access edge computing (MEC) server, (ii) determining amounts of resources of the at least one cell that are allocated to the identified user side devices in the at least one cell through a second set of queries, different than the first set of queries, to a second API of the MEC server, the second API of the MEC server being different than the first API of the MEC server, the second set of queries specifying target user side devices corresponding to respective ones of the identified user side devices as determined via the first set of queries, and (iii) computing the remaining resource capacity as a function of the amounts of resources that are allocated to the identified user side devices in the at least one cell and a total resource capacity of the at least one cell, the function comprising a difference between the total resource capacity of the at least one cell and a sum of the amounts of resources that are allocated to the identified user side devices.

10. The electronic device according to claim 9, wherein the actions further comprise:

determining, based on historical signal strength and historical signal quality uploaded by at least some users and in historical data associated with each grid region, signal strength and signal quality of the corresponding grid region;

determining a remaining resource capacity of a given cell of the at least one cell as a remaining resource capacity of the corresponding grid region by acquiring a used resource capacity of the given cell; and updating the communication resource heat database based on the determined signal strength and signal quality of the corresponding grid region and the remaining resource capacity.

11. The electronic device according to claim 9, wherein the plurality of grid regions comprise two-dimensional lattice grids.

12. The electronic device according to claim 9, wherein the plurality of geographical regions comprise a plurality of cells, and the communication resource heat database further comprises a cell handover alarm belt region of the plurality of cells, the cell handover alarm belt region being determined based on a position for cell handover among the plurality of cells in historical data associated with the plurality of cells.

13. The electronic device according to claim 12, wherein the actions further comprise:

determining, in response to the user side device entering the cell handover alarm belt region when moving from a first cell of the plurality of cells to a second cell, communication resource heat of the first cell and the second cell, the communication resource heat comprising at least signal quality and signal strength of the first cell and the second cell; and determining, based on the determined communication resource heat of the first cell and the second cell, a position at which the user side device hands over from the first cell to the second cell.

14. The electronic device according to claim 13, wherein the communication resource heat of the first cell and the second cell further comprises remaining resource capacities of the first cell and the second cell, the remaining resource capacities being determined based on used resource capacities of the first cell and the second cell.

15. The electronic device according to claim 12, wherein the plurality of cells correspond to roadside base stations of the Internet of Vehicles respectively, and the user side device is a vehicle or a navigation device built in the vehicle.

16. The electronic device according to claim 9, wherein the communication resource heat of each geographical region in the communication resource heat database is predicted based on historical data associated with the geographical region.

17. A computer program product that is tangibly stored on a non-transitory computer-readable medium and comprises machine-executable instructions, wherein the machine-executable instructions, when executed by a machine, cause the machine to perform actions comprising:

acquiring a source geographical location and a destination geographical location received from a user side device;

determining a navigation path from the source geographical location to the destination geographical location based on a communication resource heat database, the communication resource heat database comprising at least a plurality of geographical regions associated with the navigation path and communication resource heat of each of the plurality of geographical regions, the communication resource heat comprising signal quality, signal strength, and a remaining resource capacity; and sending the determined navigation path to the user side device;

wherein the plurality of geographical regions comprise respective ones of a plurality of grid regions of at least one cell of a cellular system;

wherein the signal quality and signal strength are each separately determined on a per grid region basis for each of the plurality of grid regions of the at least one cell, the communication resource heat database comprising separate grid-level entries for respective multiple ones of the grid regions in a particular one of the cells, the multiple grid regions collectively spanning the particular cell in its entirety, with a given one of the grid-level entries for a corresponding one of the grid regions being based on the signal quality and signal strength determined for the corresponding grid region, and wherein the grid-level entries for the respective multiple ones of the grid regions in the particular one of the cells are each associated in the communication resource heat database with a same value of remaining resource capacity for the particular one of the cells; and wherein the remaining resource capacity is determined on a per cell basis, for each of the one or more cells, for association with each of the plurality of grid regions of a corresponding one of the one or more cells, by (i) identifying user side devices in the at least one cell through a first set of queries to a first application programming interface (API) of a multi-access edge computing (MEC) server, (ii) determining amounts of resources of the at least one cell that are allocated to the identified user side devices in the at least one cell through a second set of queries, different than the first set of queries, to a second API of the MEC server, the second API of the MEC server being different than the first API of the MEC server, the second set of queries specifying target user side devices corresponding to respective ones of the identified user side devices as determined via the first set of queries, and (iii) computing the remaining resource capacity as a function of the amounts of resources that are allocated to the identified user side devices in the at least one cell and a total resource capacity of the at least one cell, the function comprising a difference between the total resource capacity of the at least one cell and a sum of the amounts of resources that are allocated to the identified user side devices.

18. The computer program product according to claim 17, wherein the actions further comprise:

determining, based on historical signal strength and historical signal quality uploaded by at least some users and in historical data associated with each grid region, signal strength and signal quality of the corresponding grid region;

determining a remaining resource capacity of a given cell of the at least one cell as a remaining resource capacity of the corresponding grid region by acquiring a used resource capacity of the given cell; and updating the communication resource heat database based on the determined signal strength and signal quality of the corresponding grid region and the remaining resource capacity.

19. The computer program product according to claim 17, wherein the plurality of geographical regions comprise a plurality of cells, and the communication resource heat database further comprises a cell handover alarm belt region of the plurality of cells, the cell handover alarm belt region being determined based on a position for cell handover among the plurality of cells in historical data associated with the plurality of cells.

20. The computer program product of claim 19, wherein the actions further comprise:

determining, in response to the user side device entering the cell handover alarm belt region when moving from a first cell of the plurality of cells to a second cell, communication resource heat of the first cell and the second cell, the communication resource heat comprising at least signal quality and signal strength of the first cell and the second cell; and determining, based on the determined communication resource heat of the first cell and the second cell, a position at which the user side device hands over from the first cell to the second cell.

* * * * *